United States Patent [19]

Lewis

[11] 3,873,494

[45] Mar. 25, 1975

[54] OIL-RESISTANT AND AGING-RESISTANT ELASTOMERS

[75] Inventor: Kathrine Johnson Lewis, West Los Angeles, Calif.

[73] Assignee: E. I. du Pont de Nemours and Company, Wilmington, Del.

[22] Filed: Apr. 9, 1974

[21] Appl. No.: 459,323

Related U.S. Application Data

[63] Continuation-in-part of Ser. No. 358,370, May 8, 1973, abandoned.

[52] U.S. Cl......... 260/42.37, 260/42.32, 260/42.44, 260/42.47, 260/45.9 R, 260/45.95, 260/873 R, 260/879, 260/889
[51] Int. Cl............................................. C08d 9/08
[58] Field of Search ........ 260/12.52, 889, 879, 878, 260/42.47, 42.32, 42.37

[56] References Cited

UNITED STATES PATENTS

| | | | |
|---|---|---|---|
| 3,073,371 | 1/1963 | Leeper | 260/889 |
| 3,454,676 | 7/1969 | Busse | 260/889 |
| 3,562,229 | 2/1971 | Bauer et al. | 260/889 |

*Primary Examiner*—Murray Tillman
*Assistant Examiner*—J. Ziegler

[57] ABSTRACT

The vulcanization of ethylene/acrylic ester or ethylene/vinyl acetate polymers in the presence of a peroxide curing system and an antioxidant system is accelerated by the presence of a butadiene/acrylonitrile polymer. The vulcanizates are oil-resistant and aging-resistant elastomeric products, which are useful in such applications as, for example, jacketing of automobile ignition cables.

15 Claims, No Drawings

OIL-RESISTANT AND AGING-RESISTANT ELASTOMERS

REFERENCE TO RELATED APPLICATION

This application is a continuation-in-part of application Ser. No. 358,370, filed May 8, 1973, now abandoned.

BACKGROUND OF THE INVENTION

This invention relates to a method of accelerating the vulcanization of peroxide-cured ethylene/acrylic ester polymers or ethylene/vinyl acetate polymers by adding thereto butadiene/acrylonitrile polymers and to the resulting polymeric blends. Such vulcanizates have good aging resistance and oil resistance.

Oil resistant and aging-resistant elastomers find important use in such applications as, for example, jacketing of automobilie ignition cables. These cables are exposed to rather high temperatures of automobile engines and, in addition, frequently come in contact with motor oils. Other uses for oil-resistant and aging-resistant elastomers include, for example, hoses, seals, and engine mounts.

Ethylene/alkyl acrylate polymers or ethylene/vinyl acetate polymers would be useable in such applications; however, they are frequently difficult to vulcanize to a sufficiently high degree to reach acceptable limits of oil resistance and heat resistance.

There is a need for aging-resistant and oil-resistant elastomers suitable in these and similar applications.

BRIEF SUMMARY OF THE INVENTION

According to this invention, it has now been discovered that the addition of butadiene/acrylonitrile polymers to certain ethylene/acrylic ester polymers or ethylene/vinyl acetate polymers accelerates the peroxide cure of the latter. There are thus provided curable blends of 1. a butadiene/acrylonitrile polymer containing about 25–50 weight percent of acrylonitrile and
2. an ethylene acrylic ester polymer or ethylene/vinyl acetate polymer, the proportion of (1) being about 1–30 parts per hundred parts by weight of (2).

The ethylene-containing polymer should contain at least 3.6 moles of ethylene per 1,000 grams of ethylene-containing polymer and can be either
   a. an ethylene/alkyl acrylate or ethylene/alkyl methacrylate copolymer, wherein the alkyl group has 1–4 carbon atoms; the proportion of the acrylic ester being about 2.5–8.0 moles of ester groups per kilogram of the copolymer;
   b. a terpolymer of ethylene with an alkyl acrylate or methacrylate wherein the alkyl group has 1–4 carbon atoms, and a third copolymerizable monomer, which may be, for example, one of the following:
   i. a $C_1$–$C_{12}$ alkyl monoester or diester of a butenedioic acid,
   ii. acrylic acid,
   iii. methacrylic acid,
   iv. carbon monoxide,
   v. acrylonitrile,
   vi. a vinyl ester,
   vii. an alkyl acrylate or alkyl methacrylate, the alkyl group having at least five carbon atoms, and
   viii. maleic anhydride; or
   c. ethylene/vinyl acetate copolymers containing at least 35% by weight vinyl acetate.

In the above terpolymer, the proportion of the acrylic ester is equivalent to about 2.5–8.0 moles of ester groups per kilogram of the polymer, and the proportion of the third monomer is no higher than about 10 weight percent of the polymer.

These blends are vulcanized in the presence of a peroxide curing system, and the blends usually also contain an antioxidant system.

DETAILED DESCRIPTION OF THE INVENTION

The butadiene/acrylonitrile polymers which form one of the components of the blends of the present invention are well known materials. They can be made, for example, by free-radical initiated copolymerization of butadiene and acrylonitrile either in solution or in emulsion, by methods known in the art. The molecular weight of these materials should be such that they exhibit Mooney Viscosities (ML-4, 212°F) of about 20–120. It is not intended to limit suitable butadiene/acrylonitrile polymers to dipolymers; terpolymers such as, for example, carboxylated butadiene/acrylonitrile polymers can also be used. These are made by copolymerization of butadiene, acrylonitrile, and a polymerizable carboxylic acid; for instance, acrylic acid or methacrylic acid. For all practical purposes, suitable butadiene/acrylonitrile polymers are available commercially.

While the proportion of acrylonitrile in the polymer is 20–50 weight percent, the preferred proportion is 25–41 weight percent, such polymers giving optimum vulcanization acceleration.

The preferred proportion of the butadiene/acrylonitrile polymer in the compositions of the present invention is 5–15 parts per 100 parts of the second component, the ethylene/acrylic ester polymer.

The ethylene-containing polymer can be a simple copolymer of ethylene with methyl acrylate, ethyl acrylate, propyl acrylate, isopropyl acrylate, a butyl acrylate, methyl methacrylate, ethyl methacrylate, propyl methacrylate, isopropyl methacrylate, a butyl methacrylate, or vinyl acetate. Such copolymers, if not commercially available, can be made by conventional and well known methods. These copolymers should have a melt index within the range of 0.1–70 at 190°C., preferably 0.5–15 as measured by ASTM method number D-1238-52T, or the substantially equivalent method ASTM D-1238-70.

The terpolymer of ethylene with an acrylic ester and a third monomer may contain as the third monomer an ester of fumaric acid or maleic acid, wherein the alcohol moiety can be, for example, methyl, ethyl, propyl, isopropyl; various isomers of butyl, pentyl, hexyl, heptyl, octyl, nonyl, decyl, undecyl, dodecyl, and the like. The third monomer may also be, among others, a vinyl ester such as, for example, vinyl acetate or vinyl butyrate. It can also be an acrylic ester such as, for example, various isomeric forms of pentyl, hexyl, heptyl, octyl, nonyl, decyl, undecyl, dodecyl, pentadecyl, and octadecyl acrylates and methacrylates. It is not practical to use as the third monomer an acrylic ester in which the alcohol moiety contains more than 18 carbon atoms.

The ethylene containing polymers constituting the second component of the compositions of this invention contain at least 3.6 moles of ethylene per 1,000 grams of polymer and from 2.5–8 moles of acrylic ester groups, depending on what ester is employed, per kilogram of the polymer, or in the case of ethylene/vinyl acetate polymers 35–80 weight percent vinyl acetate. Such polymers have the optimum combination in the vulcanized state of low temperature flexibility and oil resistance.

The compositions of the present invention are vulcanized in the presence of peroxide curing systems composed of a peroxide and optionally a coagent. Suitable peroxides are those that decompose rapidly within the range of 150°–250°C. These include, for example, dicumyl peroxide, 2,5-bis(t-butylperoxy)-2,5-dimethylhexane, and α,α-bis(t-butylperoxy)diisopropylbenzene. In a typical vulcanizing composition there will be about 0.5–5 parts by weight of peroxide per 100 parts of polymeric blend. The peroxide may be adsorbed on an inert carrier such as calcium carbonate, carbon black, or Kieselguhr; however, the weight of the carrier is not included in the above range.

The coagent can be, for example, N,N'-(m-phenylene)-dimaleamide, trimethylolpropane trimethylacrylate, tetraallyloxyethane, triallyl cyanurate, tetramethylene acrylate, or polyethylene oxide glycol dimethyacrylate. The amount of the coagent is about 0–5 parts by weight per 100 parts of polymeric blend, about 1–3 parts per 100 being preferred.

The coagents usually contain multiple unsaturated groups such as allyl or acrylic esters. While their mode of action is not known with certainty, it is believed that they react with the initial radical formed on the polymer backbone to form a more stable radical, which undergoes coupling reactions to form crosslinks more readily than chain scission reactions.

The vulcanizates of the present invention may also contain an antioxidant system based on a phosphorus ester antioxidant, a hindered phenolic antioxidant, an amine antioxidant, or a mixture of two or more of these compounds. The phosphorus ester compound can be, for example:

tri(mixed mono- and dinonylphenyl) phosphite, tris(-3,5-di-t-butyl-4-hydroxyphenyl) phosphate, high molecular weight poly(phenolic phosphonates), and
6-(3,5-di-t-butyl-4-hydroxy)benzyl-6H-dibenz-[c,e][1,2]oxaphosphorin-6-oxide.

The hindered phenolic compounds include, for example, the following:

4,4-butylidenebis(6-t-butyl-m-cresol),
1,3,5-trimethyl-2,4,6-tris-(3,5-di-t-butyl-4-hydroxybenzyl)benzene,
2,6-di-t-butyl-α-dimethylamino-p-cresol, and
4,4'-thiobis-(3-methyl-6-t-butylphenol).

Suitable amine antioxidants include, among others, the following: polymerized 2,2,4-trimethyl-1,2-dehydroquinoline; N-phenyl-N'-(p-toluenesulfonyl)-p-phenylenediamine; N,N'-di(β-naphthyl)-p-phenylenediamine; low temperature reaction product of phenyl (β-naphthyl)amine and acetone; and 4,4'-bis(α,α-dimethylbenzyl)diphenylamine.

The proportion of the antioxidant compound in the vulcanizing composition is 0.1–5 parts per 100 parts of polymer, the preferred proportion being 0.5–2.5.

The antioxidant is required for good heat aging compositions. The antioxidant effect is usually quite low below the preferred range and impractically low below the broad range recited above. Above the higher limits, little additional improvement is observed, and there may be adverse effects on the state of cure. The weight ratio of the phenolic or amine antioxidant to the phosphorus compound in the mixtures is about 0.5–3, the preferred ratio being about 1.

The preferred antioxidant compositions contain tri(-mixed mono and dinonylphenyl) phosphite in mixture with either 4,4'-bis(α,α-dimethylbenzyl)diphenylamine or 4,4'-butylidenebis(6-t-butyl-m-cresol).

It is often desirable to add fillers to reduce cost and to improve mechanical properties. A typical vulcanized composition will usually contain about 15–40 volume percent of fillers, for example, carbon black, barium sulfate, magnesium silicate, or silica. Other conventional fillers can also be used. The preferred proportion of the fillers is 20–25 volume percent, and also depends on the reinforcing effect of the individual fillers. Below the lower limit, the improvement of tensile properties is quite low; while above the upper limit, the heat aging resistance of the polymer is adversely affected.

For the purpose of the present specification and claims, the word "filler," whether in singular or plural, means one filler or a mixture of fillers in a composition.

The ingredients of the vulcanizing composition are thoroughly mixed, for example, on a rubber mill or in a Banbury mixer. The resulting rubber compound can be molded or extruded and cured for 0.2–50 min. at 150°–230°C. by any convenient method; for example, in a press, in a steam tube, a fluidized bed, or a molten metal bath. The preferred cure conditions are 0.5–5 minutes at 180°–205°C.

The vulcanizates obtained from the polymer blends of the present invention have good compression set resistance, good low temperature flexibility (for example, at −30°C), good heat resistance at high temperatures (for example, at 150°–220°C), and good oil resistance.

This invention is now illustrated by the following examples of certain representative embodiments thereof, wherein all parts, proportions, and percentages are by weight unless otherwise indicated.

Table I shows the composition of the rubber stocks described in Examples 1–14 in parts of each component. The rubber stocks of Examples 1, 2, and 4–14 were mixed on a 3 by 8 inch rubber mill at room temperature for 10 minutes. The ethylene/acrylic ester polymer, butadiene/acrylonitrile polymer and fillers were blended together first, the antioxidants and curing agents being added toward the end of the mixing cycle. Resulting stocks were press-cured into 75 mil slabs at 180°C. for 30 minutes at 640 psi, and molds were both loaded and unloaded hot. Test specimens were cut from these slabs. Volume swell in ASTM No. 3 oil at 150°C. for 3 days was determined using ASTM method D-471. Tensile strength ($T_B$ in psi) and elongation ($E_B$ in %) were determined by ASTM method D-412. Melt indices of the starting ethylene/acrylic ester copolymers were determined by ASTM method D-1238-52T.

The rubber stock of Example 3 was prepared by blending the ingredients in a midget Banbury mixer at 50°–60°C. for 10 minutes. Test specimens were then prepared and tested as described above.

Table II gives the test results obtained for the vulcanized compositions of Examples 1–14.

TABLE I

| Example | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Ethylene/Acrylic Ester Polymer | a) | 100 | 100 | 100 | 100 | 100 | 100 | 100 | — | — | — | — | — | — | — |
| Ethylene/Acrylic Ester Polymer | b) | — | — | — | — | — | — | — | 100 | 100 | — | — | — | — | — |
| Ethylene/Acrylic Ester Polymer | c) | — | — | — | — | — | — | — | — | — | 100 | 100 | 100 | — | — |
| Ethylene/Acrylic Ester Polymer | d) | — | — | — | — | — | — | — | — | — | — | — | — | 100 | 100 |
| Butadiene/Acrylonitrile Copolymer | e) | — | 10 | 10 | — | 10 | — | 10 | — | 10 | — | 10 | — | — | — |
| Butadiene/Acrylonitrile Copolymer | f) | — | — | — | — | — | — | — | — | — | — | — | 10 | — | — |
| Butadiene/Acrylonitrile Terpolymer | g) | — | — | — | — | — | — | — | — | — | — | — | — | — | 10 |
| FEF Black | | 10 | 10 | 10 | 50 | 50 | 10 | 10 | 50 | 55 | 50 | 55 | 55 | 10 | 10 |
| MT Black | | — | — | — | — | — | 40 | 40 | — | — | — | — | — | — | — |
| BaSO$_4$ | | 110 | 110 | 61 | — | — | — | — | — | — | — | — | — | 61 | 61 |
| Anhydrous SiO$_2$ | | — | — | 18.3 | — | — | — | — | — | — | — | — | — | 18.3 | 18.3 |
| Tris-nonylphenyl phosphite | | 1 | 1 | 1 | 1 | 1 | 1 | 1 | 1 | 1 | 1 | 1 | 1 | 1 | 1 |
| 4,4'-Butylidene-bis-(6-t-butyl-m-cresol) | | 1 | 1 | 1 | 1 | 1 | 1 | 1 | 1 | 1 | — | — | — | 1 | 1 |
| 1,3,5-Trimethyl-2,4,6-tris-(3,5-di-t-butyl-4-hydroxybenzyl)benzene | | — | — | — | — | — | — | — | — | — | 1 | 1 | 1 | — | — |
| Dicumyl peroxide (40% on CaCO$_3$) | | 5 | 5 | 5 | 5 | 5 | 5 | 5 | 5 | 5 | 5 | 5 | 5 | 5 | 5 |
| N,N'-(m-phenylene)dimaleimide | | 2 | 2 | 2 | 2 | 2 | 2 | 2 | 2 | 2 | 2 | 2 | 2 | 2 | 2 | a) Ethylene/51% methyl acrylate/3.9% ethyl hydrogen maleate, melt index 0.95.
b) Ethylene/50% methyl acrylate, melt index 0.6.
c) Ethylene/53% ethyl acrylate/2.3% ethyl hydrogen maleate, melt index 0.48.
d) Ethylene/55% methyl acrylate/3.5% ethyl hydrogen maleate, melt index 1.2.
e) Butadiene/41% acrylonitrile, powder form, Mooney viscosity 115.
f) Butadiene/41% acrylonitrile, gum form, Mooney viscosity 80.
g) Butadiene/26.5% acrylonitrile/acrylic acid, gum form, Mooney viscosity 42-58.

TABLE II

| Example | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Vulcanizate Properties | | | | | | | | | | | | | | |
| $T_B$ | 1130 | 1310 | 1400 | 1930 | 2200 | 1545 | 1555 | 2050 | 2110 | 1850 | 1840 | 1590 | 1325 | 1180 |
| $E_B$ | 610 | 530 | 565 | 390 | 340 | 415 | 420 | 315 | 260 | 410 | 290 | 300 | 630 | 540 |
| % Volume Swell | 98 | 87 | 81 | 89 | 77 | 92 | 84 | 127 | 102 | 183 | 120 | 126 | 91 | 85 |
| After aging 14 d/177°C. | | | | | | | | | | | | | | |
| % $T_B$ retained | 15 | 80 | 107 | 39 | 58 | 31 | 67 | 35 | 48 | 42 | 60 | 67 | 43 | 102 |
| % $E_B$ retained | 2 | 30 | 30 | 15 | 24 | 24 | 24 | 25 | 38 | 24 | 36 | 43 | 9 | 22 |

The above data show that the vulcanizates containing butadiene/acrylonitrile copolymer achieved a higher state of cure, which was reflected in lower oil swell. This can be seen by comparing any two vulcanizates of the same polymer with the same filler type and loading, with and without the butadiene/acrylonitrile copolymer; for example, respectively — Examples 2 with 1, 5 with 4, 7 with 6, 9 with 8, 11 or 12 with 10 and 14 with 13. These results were obtained whether the ethylene/acrylic ester polymer was a terpolymer or a copolymer, and whether the filler was mostly the non-reinforcing BaSO$_4$, the highly reinforcing FEF Black, or the less reinforcing MT Black.

The samples containing butadiene/acrylonitrile polymer also show markedly increased retention of tensile strength after heat aging, compared to the samples of ethylene/acrylic ester polymer alone. Tensile strips were aged in air ovens at 177°C. Comparing the same sets of examples as above, it may be seen that the percent retention of $T_B$ is higher for the butadiene/acrylonitrile copolymer blends. The difference is more noticeable in the softer stocks, those containing less reinforcing fillers such as BaSO$_4$ (Example 2 or 3 versus 1) or MT Black (Example 7 versus 6), or those containing ethyl rather than methyl acrylate as the comonomer (Example 11 or 12 versus 10) with FEF Black. Retention of elongation at break ($E_B$) was also usually increased where the butadiene/acrylonitrile polymer was added, and again was more noticeable in the softer stocks.

EXAMPLE 15

This example shows the effect of butadiene/acrylonitrile level on original and heat aged vulcanizate properties.

The rubber stocks were mixed on a 3 by 8 inch rubber mill at room temperature for 10 min. The ethylene/alkyl acrylate copolymer, nitrile rubber and fillers were blended together first, with the antioxidants and curatives being added toward the end of the mixing cycle. Resulting stocks were press cured into 75 mil slabs at 180°C. for 30 min. at 640 psi and molds were both loaded and unloaded hot. Test specimens were cut from the slabs. Volume swell in ASTM No. 3 oil at 150°C. for 3 days was determined using ASTM method D-471. Tensile strength ($T_B$ in psi) and elongation ($E_B$ in %) were determined by ASTM method D-412.

The composition of the rubber stocks and the test data are presented in Table III, below. For comparison, data for ethylene/alkyl acrylate polymer above are included in the Table.

TABLE III

| Composition | A | B | C | D |
|---|---|---|---|---|
| Ethylene/Acrylate Polymer a) | 100 | 100 | 100 | 100 |
| Nitrile Polymer b) | — | 5 | 10 | 15 |
| FEF Black | 10 | 10 | 10 | 10 |
| BaSO$_4$ | 110 | 110 | 110 | 110 |
| Tris-nonylphenyl Phosphite | 1 | 1 | 1 | 1 |
| 4,4'-Butylidene-bis(6-t-butyl-m-cresol) | 1 | 1 | 1 | 1 |
| Dicumyl Peroxide (40% on CaCO$_3$) | 5 | 5 | 5 | 5 |
| N,N'-m-phenylene Dimaleimide | 2 | 2 | 2 | 2 |
| Original Vulcanizate Properties | | | | |
| $T_B$ | 1130 | 1210 | 1310 | 1260 |
| $E_B$ | 610 | 545 | 530 | 460 |
| % Volume Swell | 98 | 90 | 87 | 85 |

TABLE III-Continued

| Composition | A | B | C | D |
|---|---|---|---|---|
| After Aging 14 days/177°C. | | | | |
| % $T_B$ Retained | 15 | 74 | 80 | 87 |
| % $E_B$ Retained | 2 | 24 | 30 | 26 |

[a] Ethylene/51 wt. % Methyl Acrylate/3.9% Ethyl Hydrogen Maleate, Melt Index 0.95 (ASTM D-1238-52T).
[b] Butadiene/41 wt. % Acrylonitrile, powder form, Mooney Viscosity 115.

EXAMPLE 16

This example shows the butadiene/acrylonitrile rubber is unique among unsaturated elastomers in the degree of improvement of both original and heat aged vulcanizate properties of ethylene/acrylic ester polymers.

Table IV, below, shows the composition and vulcanizate properties of various rubber stocks of ethylene/acrylic ester polymers containing another polymer in place of butadiene/acrylonitrile polymer. By comparing the physical properties of these rubber stocks with those given in Table II for ethylene/acrylic ester polymers containing butadiene/acrylonitrile polymers, it can be seen that the latter show a more marked improvement. This is especially so for elongation data after 14 days of aging at 177°C., an important value for elastomers. The data were obtained as described in Example 15.

EXAMPLE 17

This example demonstrates that the butadiene/acrylonitrile polymer increases the rate of cure and stabilizes during heat aging vulcanizates prepared from ethylene/vinyl acetate polymers. The preparation of samples and the testing of them were carried out as described for examples 1–14.

TABLE IV

| Composition | A | B | C | D | E |
|---|---|---|---|---|---|
| Ethylene/Acrylate Polymer [a] | 100 | 100 | 100 | 100 | 100 |
| FEF Black | 10 | 10 | 10 | 10 | 10 |
| BASO$_4$ | 61 | 61 | 61 | 61 | 61 |
| Anhydrous SiO$_2$ | 18.3 | 18.3 | 18.3 | 18.3 | 18.3 |
| Tris-nonylphenyl Phosphite | 1 | 1 | 1 | 1 | 1 |
| 4,4'-Butylidene-bis-(6-t-butyl-m-cresol) | 1 | 1 | 1 | 1 | 1 |
| Dicumyl Peroxide (40% on CaCo$_3$) | 5 | 5 | 5 | 5 | 5 |
| N,N'-m-phenylene Dimaleimide | 2 | 2 | 2 | 2 | 2 |
| Natural Rubber | 10 | — | — | — | — |
| Styrene/Butadiene Polymer [b] | — | 10 | — | — | — |
| 1,2-Polybutadiene [c] | — | — | 10 | — | — |
| cis-1,4-Polybutadiene | — | — | — | 10 | — |
| Polychloroprene [d] | — | — | — | — | 10 |
| Original Vulcanizate Properties | | | | | |
| $T_B$ | 1230 | 1145 | 1390 | 1130 | 1230 |
| $E_B$ | 585 | 605 | 265 | 490 | 510 |
| % Volume Swell | 104 | 88 | 73 | 92 | 89 |
| After Aging 14 days/177°C. | | | | | |
| % $T_B$ Retained | 74 | 79 | 76 | 80 | 60 |
| % $E_B$ Retained | 7 | 12 | 8 | 11 | 4 |

[a] Ethylene/55 wt. % Methyl Acrylate/3.5% Ethyl Hydrogen Maleate, Melt Index 1.2 (ASTM D-1238-52T).
[b] SBR 1500.
[c] Sold as Hystl 2000 by Hystl Development Co., Redondo Beach, Calif.
[d] Sold as Neoprene W by E. I. du Pont de Nemours and Company, Inc.

TABLE V

| Composition (in parts by weight) | A | B | C | D |
|---|---|---|---|---|
| Polymer 1 [a] | 100 | 100 | | |
| Polymer 2 [b] | | | 100 | 100 |
| Nitrile Polymer [c] | | 5 | | 5 |
| Tris-nonylphenyl Phosphite | 1 | 1 | 1 | 1 |
| 4,4'-Bis($\alpha,\alpha$-dimethylbenzyl) Diphenyl Amine | 1 | 1 | 1 | 1 |
| SRF Carbon Black | 50 | 50 | 50 | 50 |
| Polyethylene Glycol [d] | 1.5 | 1.5 | 1.5 | 1.5 |
| Dicumyl Peroxide (40% on CaCO$_3$) | 5 | 5 | 5 | 5 |
| m-Phenylenedimaleimide | 2 | 2 | 2 | 2 |
| Oscillating Disk Rheometer | | | | |
| Cure Rate (in. lb./min.) | 8.5 | 14.0 | 6.0 | 9.0 |
| 30 min. Torque (in. lb./min.) | 36 | 50 | 19.5 | 27 |
| Original Vulcanizate Properties [e] | | | | |
| $T_B$ (psi) | 2025 | 2000 | 925 | 1050 |
| $E_B$ (%) | 310 | 320 | 170 | 160 |
| % Volume Swell | 201 | 174 | 116 | 101 |
| After Aging 14 days/177°C. | | | | |
| % $T_B$ Retained | 69 | 74 | 70 | 98 |
| % $E_B$ Retained | 66 | 69 | 12 | 38 |

[a] Ethylene/40 wt. % vinyl acetate copolymer having a melt index of about 57 g/10 min.
[b] Ethylene/62 wt. % vinyl acetate copolymer of melt index 0 at 190°C. and Tg −29°C.
[c] Butadiene/41 wt. % acrylonitrile copolymer, powder form, Mooney Viscosity 115.
[d] Sold as "Carbowax" 4000
[e] Press Cured 15 min./177°C.

I claim:
1. A curable blend of
   1. an ethylene containing polymer and
   2. a butadiene/acrylonitrile polymer containing about 25–50 weight percent of acrylonitrile, the proportion of said butadiene/acrylonitrile polymer being 1–30 parts per hundred parts by weight of said ethylene containing polymer; the ethylene containing polymer having at least 3.6 moles of ethylene per 1,000 grams of the ethylene containing polymer and being selected from the group consisting of:
      a. an ethylene/alkyl acrylate or ethylene/alkyl methacrylate copolymer, wherein the alkyl group has 1–4 carbon atoms; the proportion of the acrylic ester being about 2.5–8 moles of ester groups per kilogram of the copolymer;
      b. a terpolymer of ethylene with an alkyl acrylate or methacrylate wherein the alkyl group has 1–4 carbon atoms, and a third monomer selected from the group consisting of:
         i. a $C_1$–$C_{12}$ alkyl monoester or diester of a butenedioic acid,
         ii. acrylic acid
         iii. methacrylic acid,
         iv. carbon monoxide,
         v. acrylonitrile,
         vi. a vinyl ester,
         vii. an alkyl acrylate or methacrylate wherein the alkyl group has at least five carbon atoms, and
         viii. maleic anhydride,
   the proportion of the acrylic ester being equivalent to 2.5–8.0 moles of ester groups per kilogram of the polymer, and the proportion of the third monomer being no higher than about 10 weight percent of the polymer.

2. A blend of claim 1 wherein the proportion of acrylonitrile in the butadiene/acrylonitrile polymer is 25–41 weight percent.

3. A blend of claim 1 wherein the proportion of the butadiene/acrylonitrile polymer is 5–15 parts per hundred parts of the ethylene containing polymer.

4. A blend of claim 1 wherein the ethylene containing polymer contains acrylic ester and the acrylic ester content of the ethylene polymer is equivalent to 5–8 moles of ester groups per kilogram of the polymer.

5. A blend of claim 1 wherein the ethylene polymer is an ethylene/acrylic ester/butenedioic ester terpolymer.

6. A composition comprising a blend of claim 1, an antioxidant system, and a peroxide curing system; the proportion of the antioxidant system being about 0.1–5 parts per 100 parts by weight of polymer.

7. A composition of claim 6 wherein the peroxide curing system consists of a peroxide decomposing rapidly within the temperature range of 150°–250°C. and a coagent selected from the group consisting of N,N'-(m-phenylene) dimaleamide, trimethylolpropane trimethylacrylate, tetraallyloxyethane, triallyl cyanurate, tetramethylene acrylate, and polyethylene oxide glycol dimethacrylate.

8. A composition of claim 6 wherein the antioxidant system comprises a mixture of a phosphorus compound with a hindered phenolic antioxidant or an amine antioxidant, the weight ratio of the phenolic compound or amine to the phosphorus compound being about 0.5–3.

9. The composition of claim 8 wherein both the phenolic compound or amine and the phosphorus compound are present in about equal weights.

10. A composition of claim 6 also comprising 15–40 volume percent of a filler.

11. A composition of claim 10 wherein the proportion of the filler is 20–25 volume percent.

12. A vulcanized product obtained by heating a composition of claim 10 for 0.2–50.0 minutes at 150°–230°C.

13. A vulcanized product of claim 12 containing barium sulfate as the filler.

14. A vulcanized product of claim 12 containing silica and barium sulfate as the filler.

15. A vulcanized product of claim 12 wherein the antioxidant system consists essentially of tri(mixed mono and dinonylphenyl) phosphite in mixture with 4,4'-bis($\alpha,\alpha$-dimethylbenzyl)diphenylamine or 4,4'-butylidenebis($\beta$-t-butyl-m-cresol).

* * * * *